United States Patent
Shih

(10) Patent No.: US 8,659,885 B2
(45) Date of Patent: Feb. 25, 2014

(54) LATCH MECHANISM FOR LATCHING A MONITOR AND A HOST OF A PORTABLE COMPUTER AND RELATED PORTABLE COMPUTER

(75) Inventor: Shyuan-He Shih, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 197 days.

(21) Appl. No.: 13/230,855

(22) Filed: Sep. 13, 2011

(65) Prior Publication Data

US 2012/0087075 A1    Apr. 12, 2012

(30) Foreign Application Priority Data

Oct. 6, 2010   (TW) ................................ 99134017 A

(51) Int. Cl.
  *G06F 1/16*    (2006.01)
(52) U.S. Cl.
  USPC ...... 361/679.26; 248/611; 345/206; 312/237; 455/575.4
(58) Field of Classification Search
  USPC .......... 248/305, 611, 286.1, 157, 688, 278.1;
    345/107, 204, 211, 60, 206, 55, 87,
    345/100, 173; 312/334.44, 334.1, 323,
    312/293.1, 237, 319.2, 223.1, 223.2;
    361/679.59, 679.34, 679.06, 679.54,
    361/679.01, 679.28, 679.17, 679.55,
    361/679.41, 679.27, 679.23, 679.58,
    361/679.15, 679.22; 455/575.8, 575.1, 73,
    455/575.4, 90.3, 575.3, 128
  See application file for complete search history.

(56) References Cited

U.S. PATENT DOCUMENTS

| 7,261,331 | B2 | 8/2007 | Lin |
| 2011/0114808 | A1* | 5/2011 | Huang et al. .................. 248/305 |
| 2012/0262856 | A1* | 10/2012 | Yu ............................. 361/679.01 |

FOREIGN PATENT DOCUMENTS

| CN | 1617062 A | 5/2005 |
| TW | I225980 | 1/2005 |
| TW | 200829125 | 7/2008 |

OTHER PUBLICATIONS

Office action mailed on Nov. 30, 2012 for the China application No. 201010505471.X, p. 3 line 3-11.
Office action mailed on Apr. 22, 2013 for the Taiwan application No. 099134017, filing date: Oct. 6, 2010, p. 1 line 12~14, p. 2~4 and p. 5 line 1~18.

* cited by examiner

*Primary Examiner* — Hung Duong
(74) *Attorney, Agent, or Firm* — Winston Hsu; Scott Margo

(57) ABSTRACT

A latch mechanism includes a first latch component installed on a side of a monitor in a protrusible manner from the monitor, a pushing component connected to the first latch component for driving the first latch component to rotate in a first rotating direction when being pushed in a first moving direction so that the first latch component slides into a first slot of the monitor, and a resilient component installed on the pushing component and connected to the first latch component for driving the first latch component to rotate in a second rotating direction opposite to the first rotating direction when the pushing component is pushed in a second moving direction opposite to the first moving direction so that the first latch component protrudes out of the first slot of the monitor for latching a host.

19 Claims, 15 Drawing Sheets

LATCH MECHANISM FOR LATCHING A MONITOR AND A HOST OF A PORTABLE COMPUTER AND RELATED PORTABLE COMPUTER

BACKGROUND OF THE INVENTION

1. Field of the Invention

The present invention relates to a latch mechanism for latching a monitor and a host of a portable computer and a related portable computer, and more particularly, to a latch mechanism with a two-way latching function and a related portable computer.

2. Description of the Prior Art

Generally speaking, when a notebook computer is close, a latch mechanism is used for latching a monitor and a host in order to fix the monitor and the host. For example, a conventional latch mechanism often utilizes a hook structure, a latch structure, or a magnetic component to combine the monitor and the host. U.S. patent application Ser. No. 12/323,445 discloses a mechanism of using a link set with a pin to latch the monitor and the host. However, a movable component in the prior art is often disposed on the host, and a fixing component, such as the pin, is disposed on the monitor, so as to perform locking and releasing function by the movable component matching with the fixing component. In such a manner, the mechanism is more complicated. Furthermore, the movable component for performing latching or releasing needs more mechanical space occupied by other mechanical components of the host, such as a speaker. Since there are more components disposed in the host, the mechanical space in the host is more important than that in the monitor. Moreover, a monitor of a convertible computer designed for handwriting function can be rotated by 180 degrees. When presenting to customers, the monitor can be rotated to an adequate orientation for the customers to watch contents of the presentation. Or when discussing with colleagues, it achieves two-way communication. Furthermore, the convertible computer simultaneously has a notebook computer mode and a tablet computer mode. That is, when the monitor is rotated by 180 degrees and combined with the host, the convertible computer can be used as a tablet computer. However, a latch mechanism for the convertible computer has not been developed with a mechanism capable of two-way latching the host, that is, a design for latch mechanism of the convertible computer based on two modes has not been developed. Thus, the conventional portable computer has important issues of the latch mechanism for two-way latching.

SUMMARY OF THE INVENTION

The present invention provides a latch mechanism for latching a monitor and a host of a portable computer and a related portable computer for solving above drawbacks.

According to the claimed invention, a latch mechanism for latching a monitor and a host of a portable computer includes a first latch component installed on a side of the monitor in a protrusible manner from a first slot of the monitor; a pushing component connected to the first latch component, the pushing component being used for driving the first latch component to rotate in a first rotating direction when being pushed in a first moving direction so that the first latch component slides into the first slot of the monitor; and a resilient component installed on the pushing component and connected to the first latch component for driving the first latch component to rotate in a second rotating direction opposite to the first rotating direction when the pushing component is pushed in a second moving direction opposite to the first moving direction so that the first latch component protrudes out of the first slot of the monitor for latching the host.

According to the claimed invention, a first rotating hole and a first positioning hole are formed on an end of the first latch component, a first positioning post is disposed on a side of the pushing component, the resilient component sheathes the first positioning post, and the first positioning post of the pushing component and an end of the resilient component are respectively inserted into the first rotating hole and the first positioning.

According to the claimed invention, an inclined structure is formed on an end of the first latch component for guiding the first latch component to protrude out of the first slot of the monitor.

According to the claimed invention, a plurality of rib structures is formed on the pushing component.

According to the claimed invention, the resilient component is a torsion spring.

According to the claimed invention, the latch mechanism further includes a second latch component installed on another side of the monitor in a protrusible manner from a second slot of the monitor, the first latch component and the second latch component being respectively connected to both ends of the resilient component, the pushing component being further used for driving the second latch component to rotate in the first rotating direction when being pushed in the second moving direction so that the second latch component slides into the second slot of the monitor, and the resilient component being further used for driving the second latch component to rotate in the second rotating direction when the pushing component is pushed in the first moving direction so that the second latch component protrudes out of the second slot of the monitor for latching the host.

According to the claimed invention, a second rotating hole and a second positioning hole are formed on an end of the second latch component, a second positioning post is disposed on a side of the pushing component, the resilient component sheathes the second positioning post, and the second positioning post of the pushing component and an end of the resilient component are respectively inserted into the second rotating hole and the second positioning hole.

According to the claimed invention, an inclined structure is formed on an end of the second latch component for guiding the second latch component to protrude out of the second slot of the monitor.

According to the claimed invention, a portable computer includes a host, a hole being formed on the host; a monitor pivoted to the host, a first slot being formed on a side of the monitor; and a latch mechanism for latching the monitor and the host including a first latch component installed on the side of the monitor in a protrusible manner from the first slot of the monitor; a pushing component connected to the first latch component, the pushing component being used for driving the first latch component to rotate in a first rotating direction when being pushed in a first moving direction so that the first latch component slides into the first slot of the monitor; and a resilient component installed on the pushing component and connected to the first latch component for driving the first latch component to rotate in a second rotating direction opposite to the first rotating direction when the pushing component is pushed in a second moving direction opposite to the first moving direction so that the first latch component protrudes out of the first slot of the monitor for latching the hole of the host.

According to the claimed invention, a second slot is formed on another side of the monitor, the latch mechanism further includes a second latch component installed on another side of the monitor in a protrusible manner from the second slot of the monitor, the first latch component and the second latch component are respectively connected to both ends of the resilient component, the pushing component is further used for driving the second latch component to rotate in the first rotating direction when being pushed in the second moving direction so that the second latch component slides into the second slot of the monitor, and the resilient component is further used for driving the second latch component to rotate in the second rotating direction when the pushing component is pushed in the first moving direction so that the second latch component protrudes out of the second slot of the monitor for latching the hole of the host.

According to the claimed invention, a guiding structure and a stopping block are formed on a lateral side of the second slot of the monitor for guiding the second latch component to slide into the second slot of the monitor.

According to the claimed invention, the monitor is pivoted to the host in a convertible manner.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
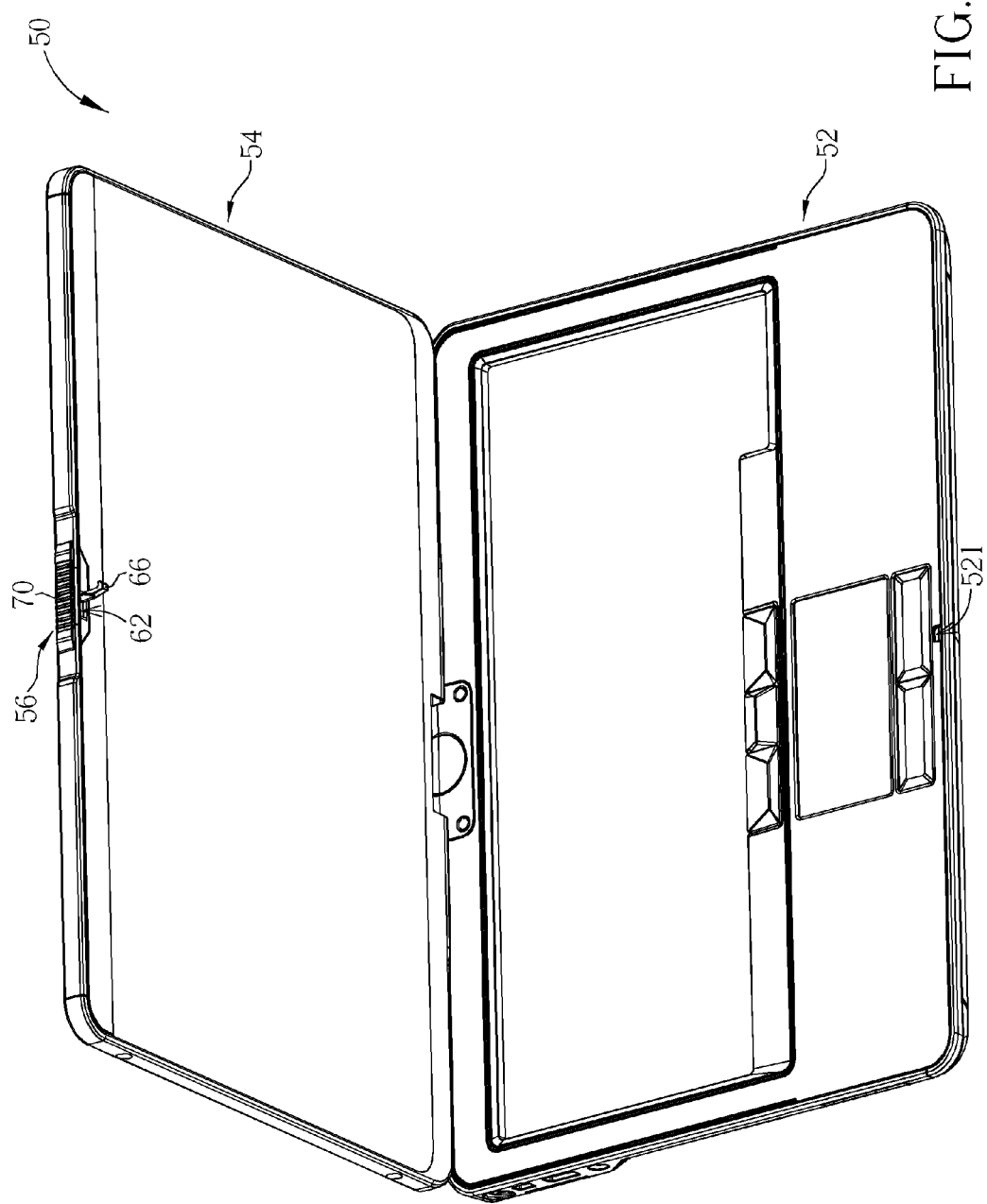
FIG. 1 and FIG. 2 are respectively schematic drawings of a portable computer in different statuses according to a preferred embodiment of the present invention.
Figure 2:
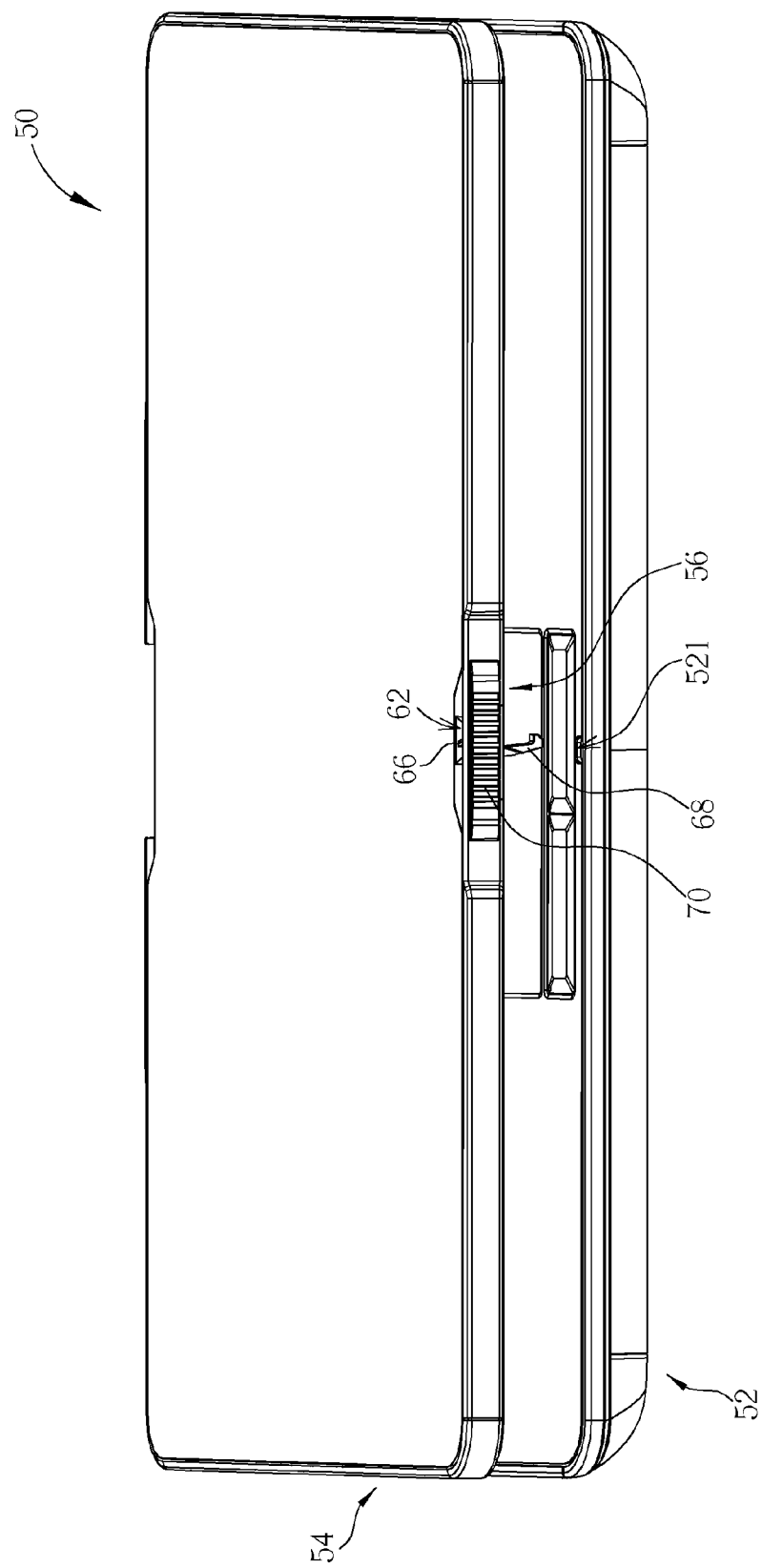

Pleas refer to FIG. 1 and FIG. 2. FIG. 1 and FIG. 2 are respectively schematic drawings of a portable computer 50 indifferent statuses according to a preferred embodiment of the present invention. The portable computer 50 can be a notebook computer, such as a convertible computer and so on. The portable computer 50 includes a host 52 with a hole 521 being formed thereon. The portable computer 50 further includes a monitor 54 pivoted to the host 52. For example, the monitor 54 is pivoted to the host 52 in a convertible manner, that is, the monitor 54 can be rotated relative to the host 52 by 180 degrees. In such a manner, the portable computer 50 has two modes of a notebook computer mode and of a tablet computer mode. In other words, one mode is for a general notebook computer as shown in FIG. 1, and the other is for a tablet computer with the monitor 54 as a touch panel, being combined with the host 52 when the monitor 54 is rotated by 180 degrees as shown in FIG. 2. In addition, the portable computer 50 further includes a latch mechanism 56 for latching the monitor 54 and the host 52. The latch mechanism 56 is for two-way latching, that is, when the portable computer 50 is at the notebook computer mode as shown in FIG. 1 and at the tablet computer mode as shown in FIG. 2, the latch mechanism 56 can be engaged with the monitor 54 and the host 52 for both two modes.

Figure 3:
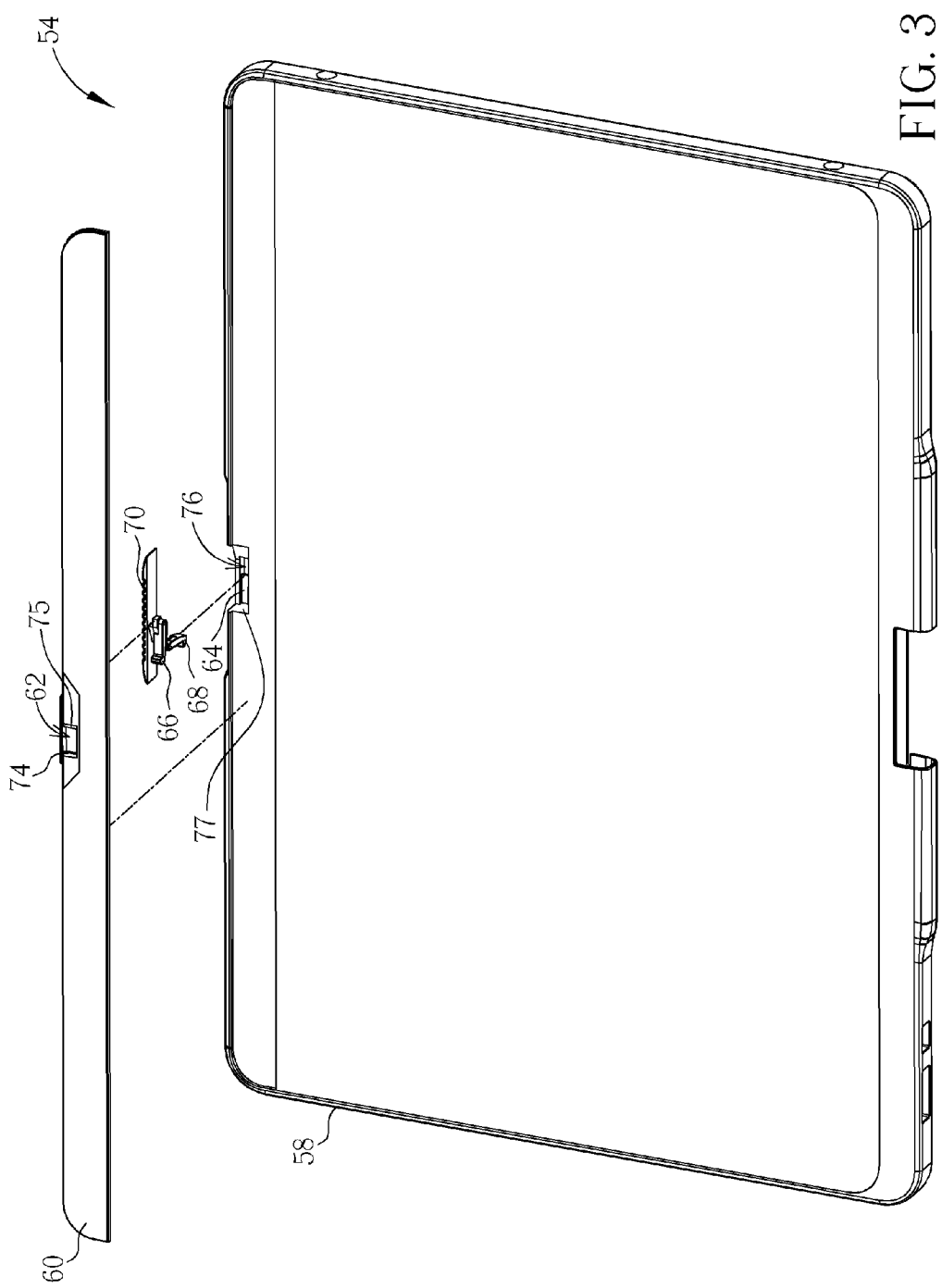
FIG. 3 is an exploded diagram of a latch mechanism installed on a monitor according to the preferred embodiment of the present invention.
Figure 4:
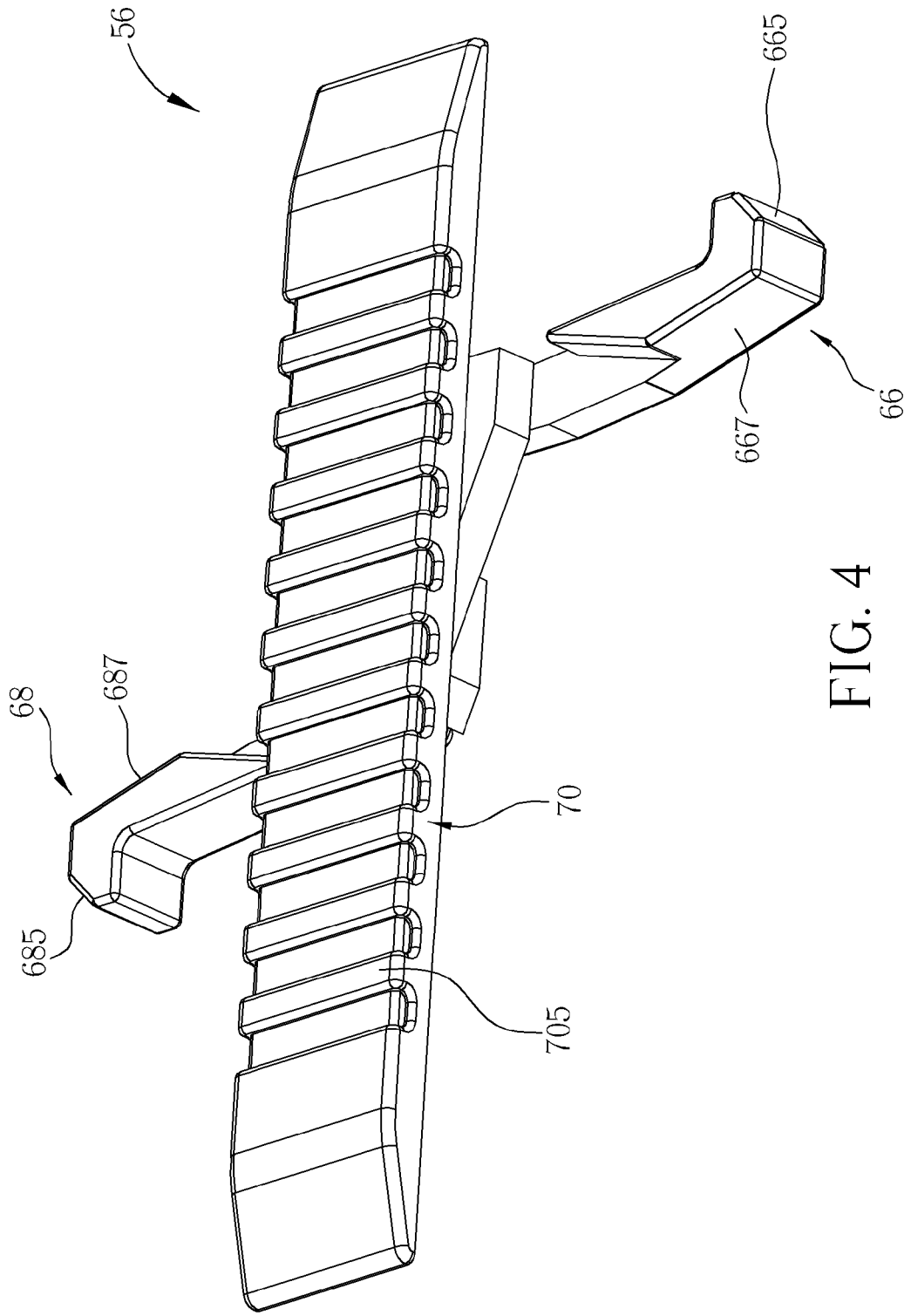
FIG. 4 and FIG. 5 are respectively diagrams in different view angles of the latch mechanism according to the preferred embodiment of the present invention.
Figure 5:
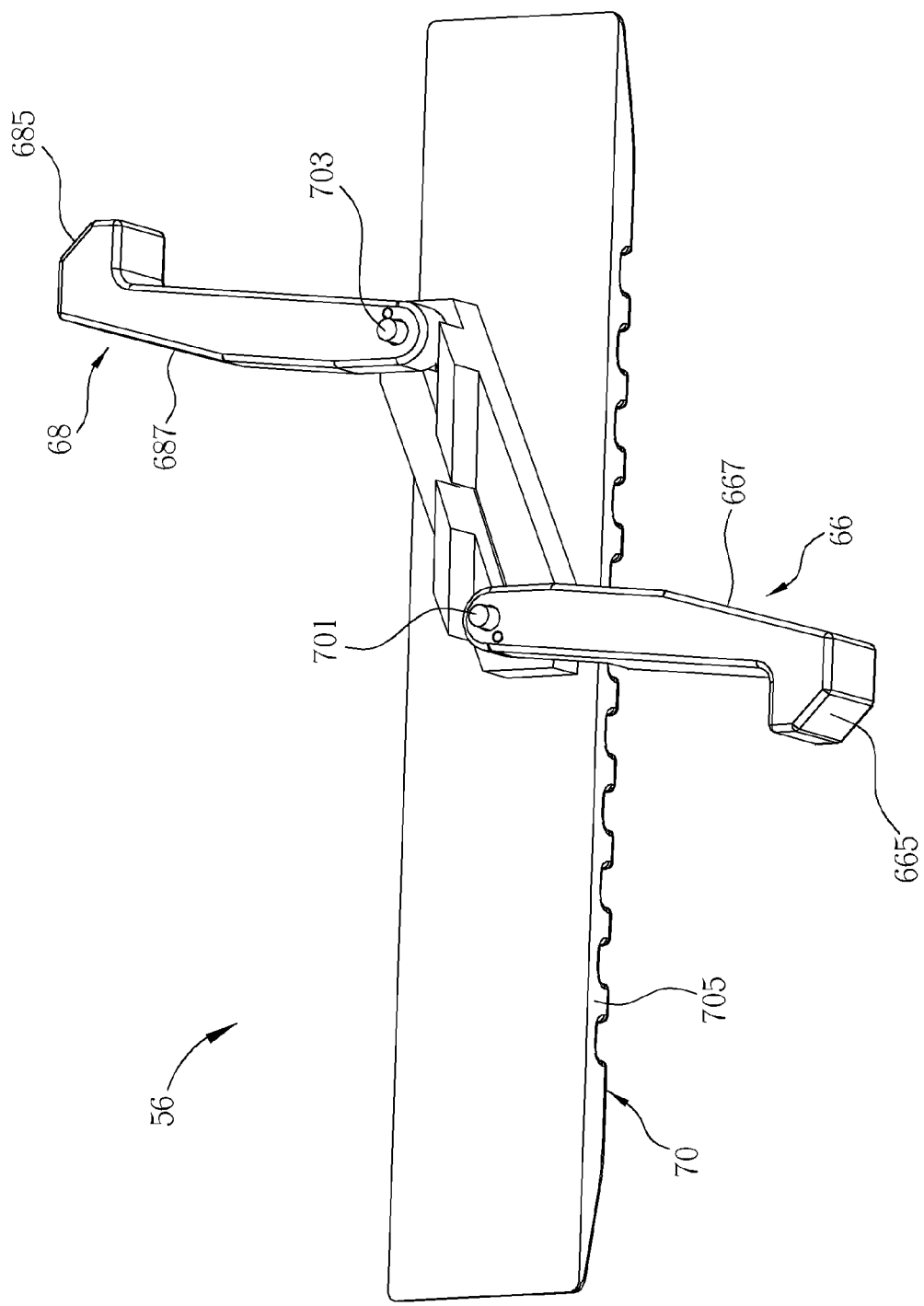
Figure 6:
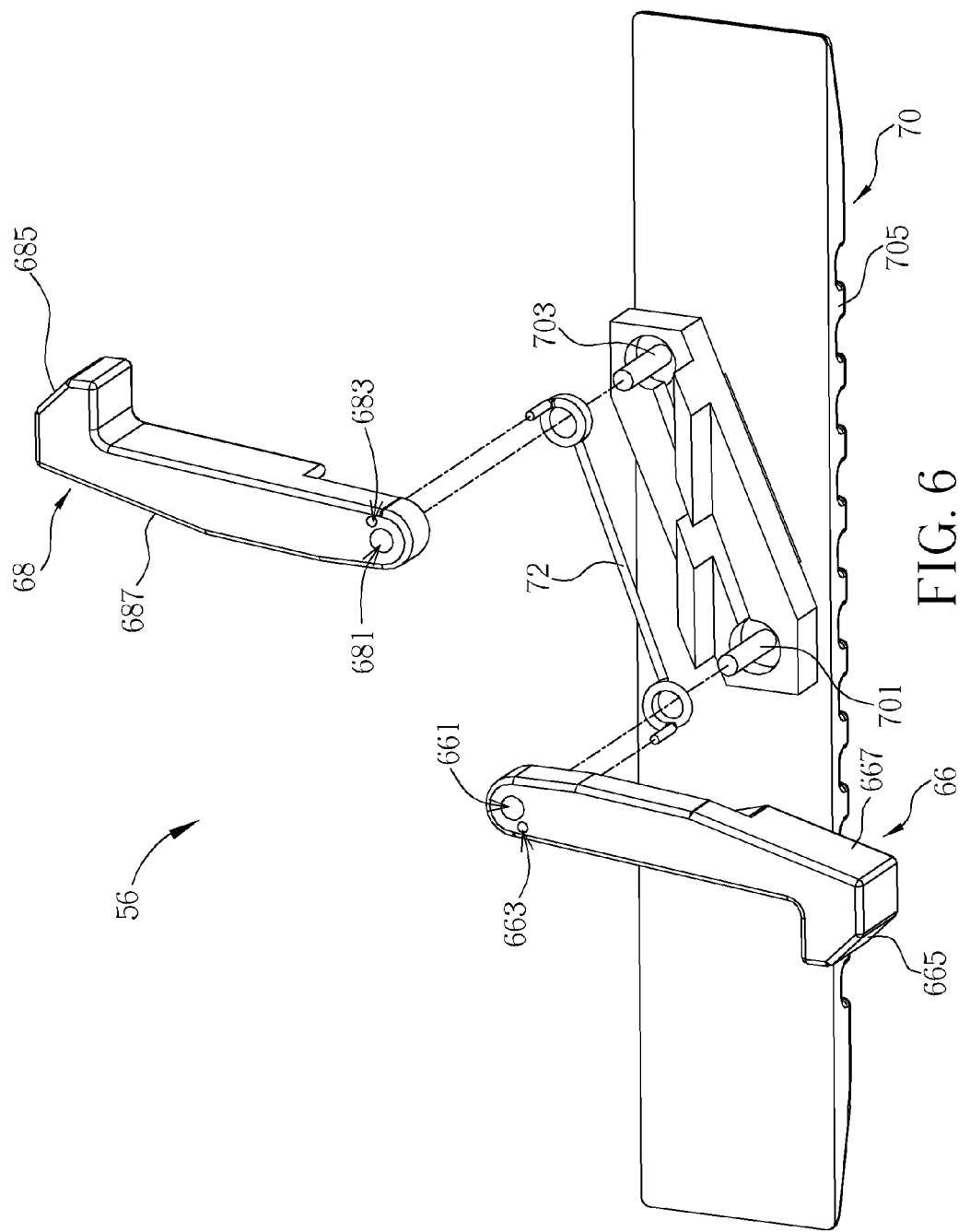
FIG. 6 is an exploded diagram of the latch mechanism according to the preferred embodiment of the present invention.

Please refer to FIG. 3 to FIG. 6. FIG. 3 is an exploded diagram of the latch mechanism 56 installed on the monitor 54 according to the preferred embodiment of the present invention. FIG. 4 and FIG. 5 are respectively diagrams in different view angles of the latch mechanism 56 according to the preferred embodiment of the present invention. FIG. 6 is an exploded diagram of the latch mechanism 56 according to the preferred embodiment of the present invention. The monitor 54 includes a casing 58 and a side plate 60. The latch mechanism 56 can be contained between the casing 58 and the side plate 60. A first slot 62 and a second slot 64 are respectively formed on opposite sides of the monitor 54, that is, on the side plate 60 and the casing 58. The latch mechanism 56 includes a first latch component 66, a second latch component 68, a pushing component 70, and a resilient component 72. The first latch component 66 is installed on a side of the monitor 54 in a protrusible manner from the first slot 62 of the monitor 54. A first rotating hole 661 and a first positioning hole 663 are formed on an end of the first latch component 66, and an inclined structure 665 is formed on the other end of the first latch component 66 for guiding the first latch component 66 into the opening 521 of the host 52 when the monitor 54 is closed. An inclined structure 667 is further formed on a side of the first latch component 66 opposite to that of the inclined structure 665 for guiding the first latch component 66 to protrude out of the first slot 62 of the monitor 54.

The second latch component 68 is installed on another side of the monitor 54 in a protrusible manner from the second slot 64 of the monitor 54. A second rotating hole 681 and the second fixing hole 683 are formed on an end of the second latch component 68, and an inclined structure 685 is formed on the other end of the second latch component 68 for guiding the second latch component 68 into the opening 521 of the host 52 when the monitor 54 is closed. An inclined structure 687 is further formed on a side of the second latch component 68 opposite to that of the inclined structure 685 for guiding the second latch component 68 to protrude out of the second slot 64 of the monitor 54. Basically, the first latch component 66 and the second latch component 68 can be components with the same structures for managing manufacture and part preparation easily. The pushing component 70 is connected to the first latch component 66 and the second latch component 68, and the pushing component 70 can be a push button. When the pushing component 70 is pushed, the first latch component 66 can move with the second latch component 68. A first positioning post 701 and a second positioning post 703 are disposed on a side of the pushing component 70, and a plurality of rib structures 705 is formed on the pushing component 70 for providing a place where force is applied for pushing the pushing component 70.

Figure 7:
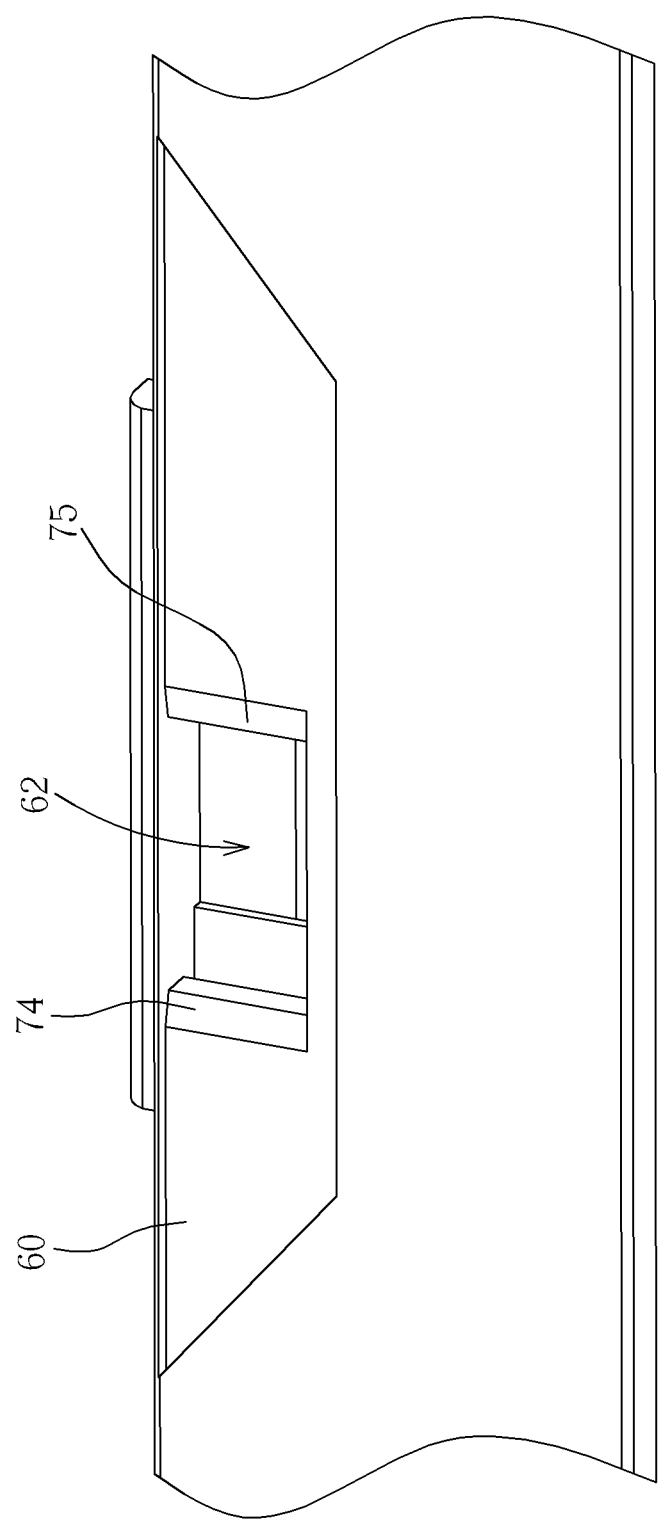
FIG. 7 is an enlarged view of a side plate according to the preferred embodiment of the present invention.

The resilient component 72 is installed on the pushing component 70, and two ends of the resilient component 72 are respectively connected to the first latch component 66 and the second latch component 68. The two ends of the resilient component 72 respectively sheathes the first positioning post 701 and the second positioning post 703, and the first positioning post 701 of the pushing component 70 and an end of the resilient component 72 are respectively inserted into the first rotating hole 661 and the first positioning hole 663. The first positioning post 701 can be a rotating axis after being inserted into the first rotating hole 661, and the first positioning hole 663 is used for connecting the first latch component 66 and a body of the resilient component 72. The second positioning post 703 of the pushing component 70 and another end of the resilient component 72 are respectively inserted into the second rotating hole 681 and the second positioning hole 683. The second positioning post 703 can be a rotating axis after being inserted into the second rotating hole 681, and the second positioning hole 683 is used for connecting the second latch component 68 and a body of the resilient component 72. In such a manner, the first latch component 66, the second latch component 68 and the resilient component 72 can be fixed on the pushing component 70. In addition, please refer to FIG. 3 and FIG. 7. FIG. 7 is an enlarged view of the side plate 60 according to the preferred embodiment of the present invention. A guiding structure 74 and a stopping block 75 are formed on a lateral side of the first slot 62 of the monitor 54. A guiding structure 76 and a stopping block 77 can be also formed on a lateral side of the second slot 64 of the casing 58 of the monitor 54. The guiding structure 74 and the stopping block 75 are used for guiding the first latch component 66 to slide into the first slot 62 of the monitor 54, and the guiding structure 76 and the stopping block 77 are used for guiding the second latch component 68 to slide into the second slot 64 of the monitor 54.

Figure 8:
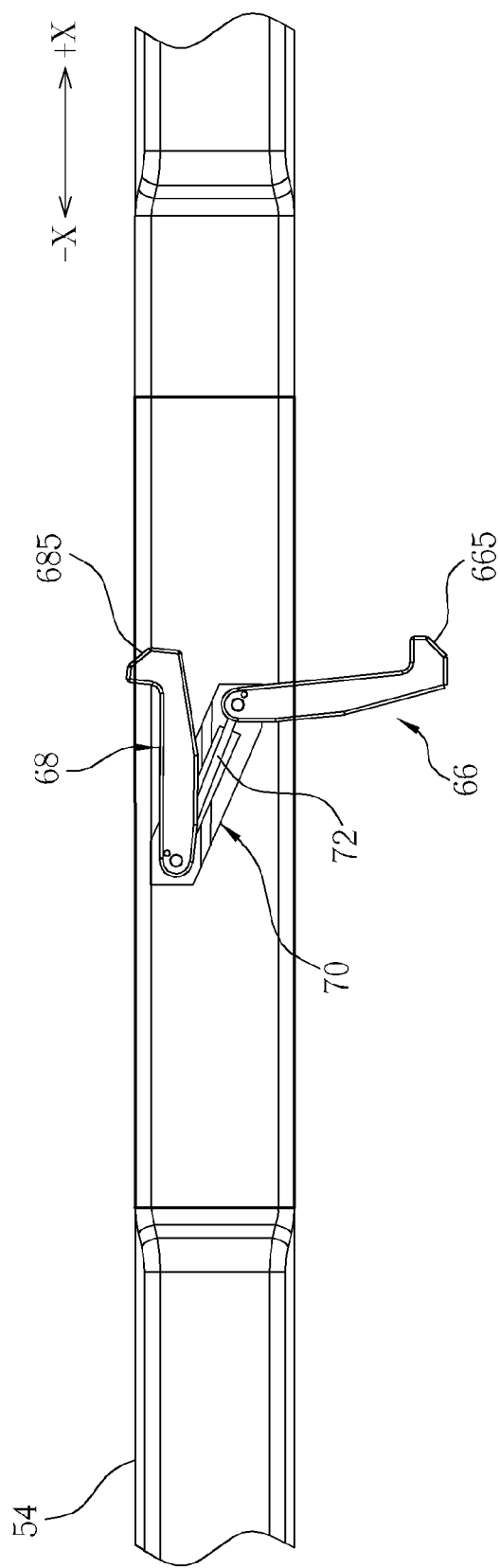
FIG. 8 to FIG. 12 are diagrams of consecutive motions of internal structures of the latch mechanism according to the preferred embodiment of the present invention.
Figure 9:
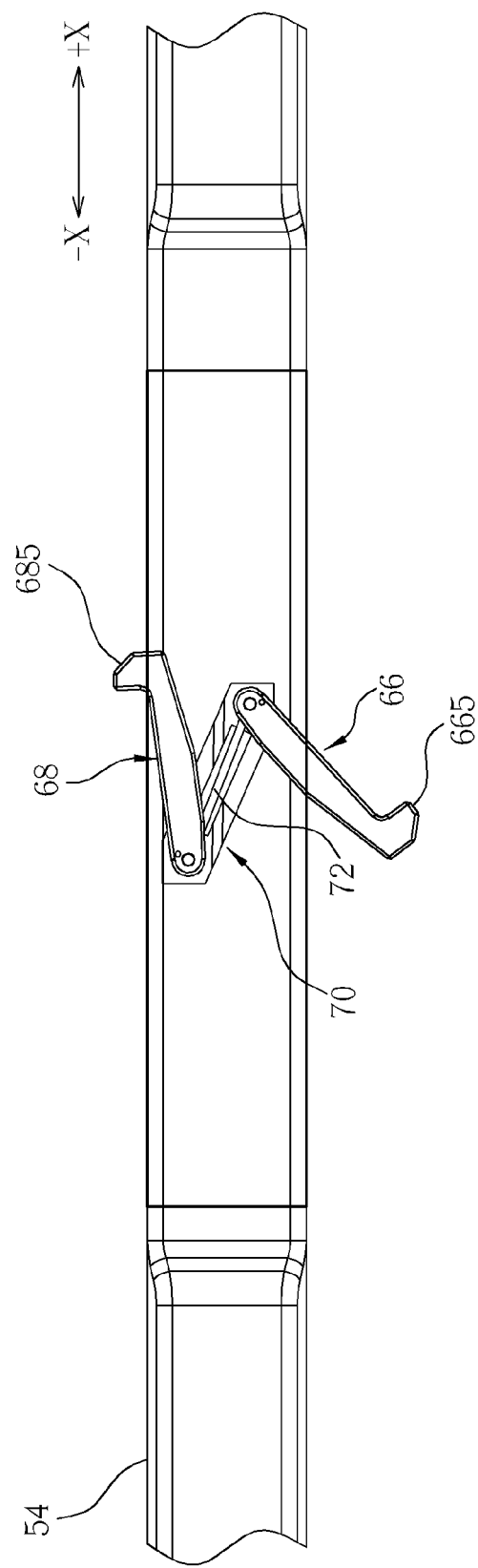
Figure 10:
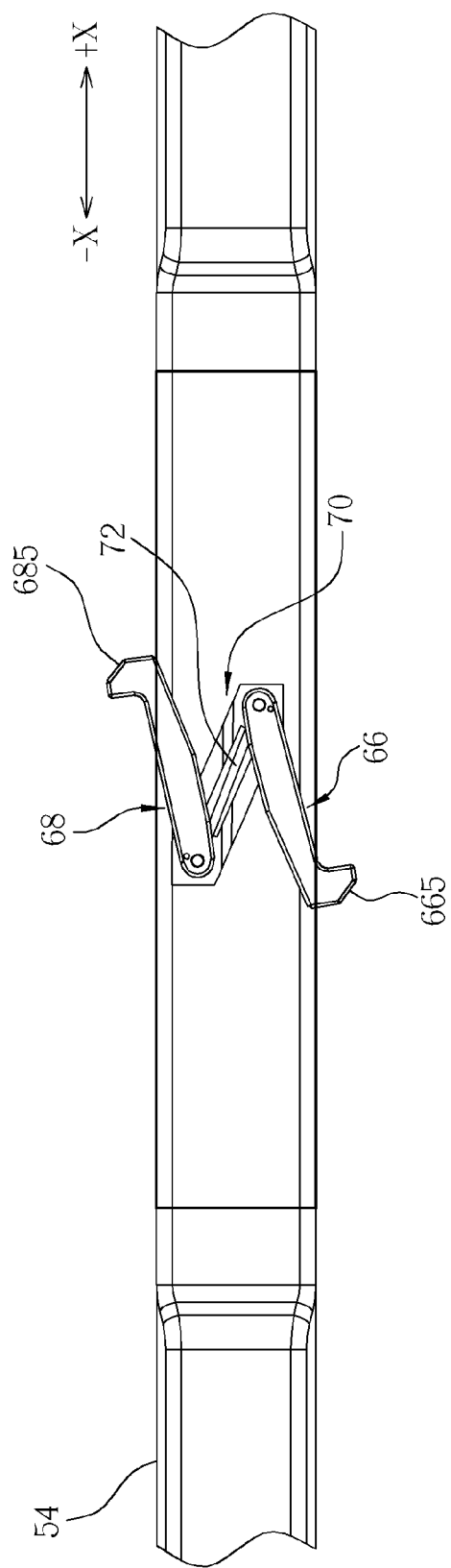
Figure 11:
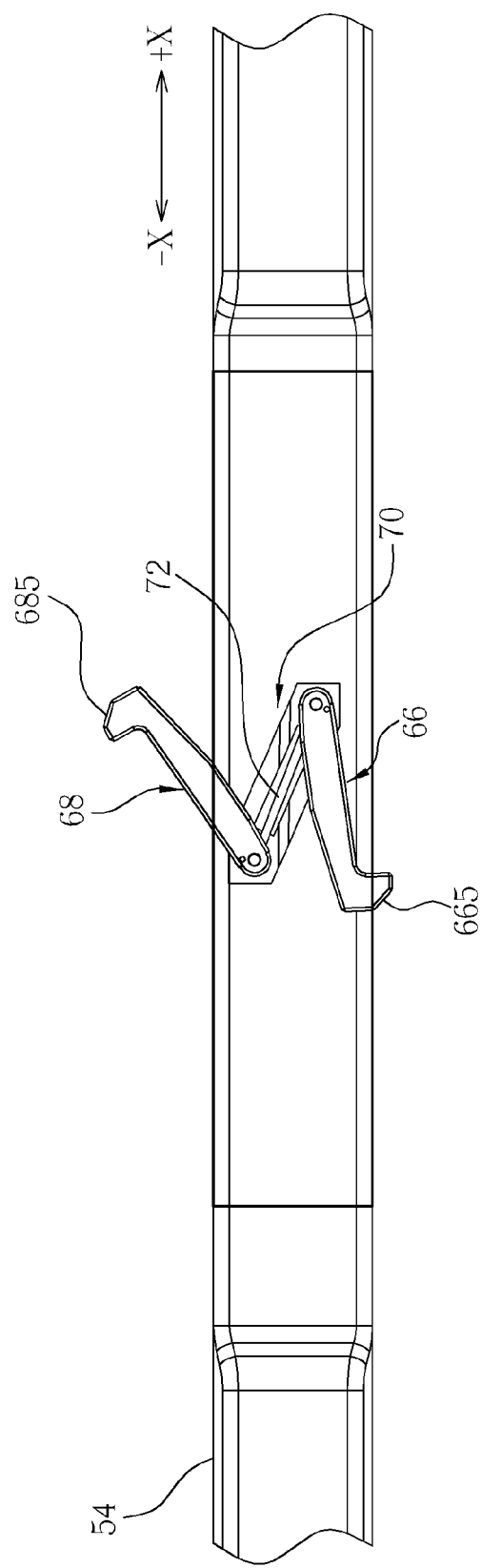
Figure 12:
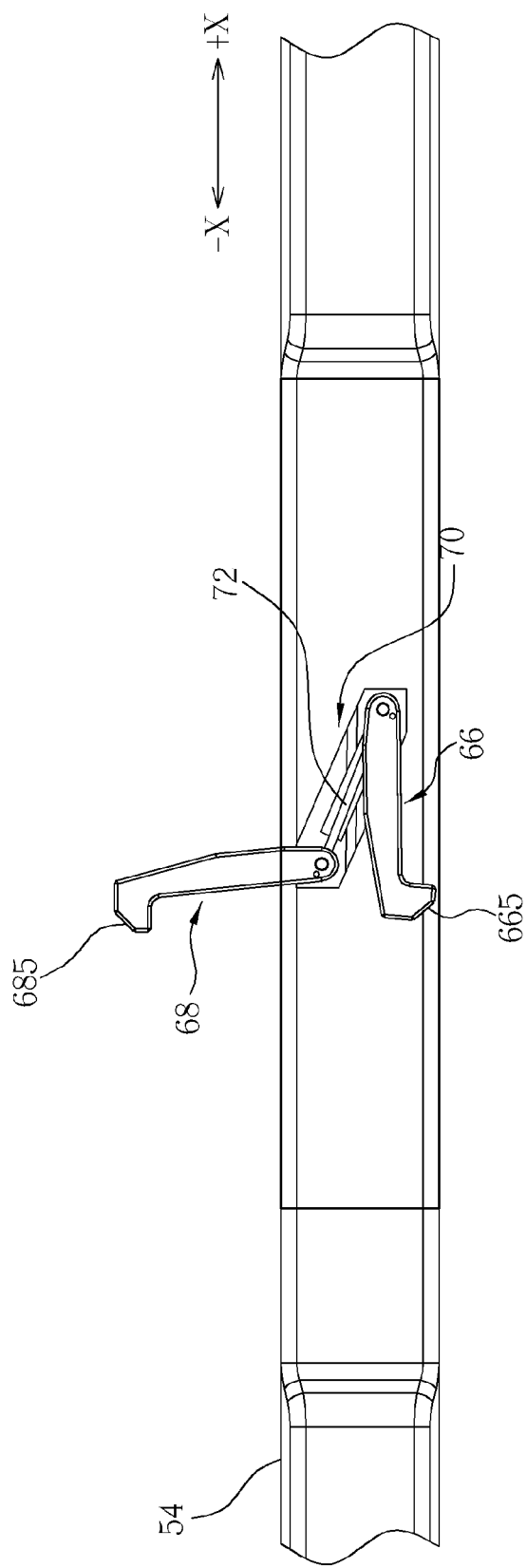

Please refer to FIG. 1 to FIG. 11. FIG. 8 to FIG. 12 are diagrams of consecutive motions of internal structures of the latch mechanism 56 according to the preferred embodiment of the present invention. In order to illustrate relative position of the first latch component 66 and the second latch component 68 on the monitor 54 clearly, FIG. 8 to FIG. 12 illustrates the first latch component 66 and the second latch component 68 in a perspective manner. As shown in FIG. 8, when the first latch component 66 protrudes from the first slot 62 completely, the second latch component 68 does not protrude from the second slot 64 and is contained in the monitor 54. At this time, the first latch component 66 can be used for being engaged in the hole 521 of the host 52. That is, the portable computer 50 is used as a notebook computer as shown in FIG. 1, and the host 52 is engaged with the monitor 54 by the first latch component 66. When the pushing component is pushed to move in a first direction (+X direction), the first latch component 66 is rotated in a first rotating direction (clockwise direction), so that the first latch component 66 gradually slides into the first slot 62 of the monitor 54. When the first latch component 66 slides into the first slot 62 of the monitor 54 smoothly guided by the guiding structure 74 and the stopping block 75, the second latch component 68 gradually protrudes out of the second slot 64 of the monitor 54 since the resilient component 72 provides a torque to gradually drive the second latch component 68 to rotate in a second rotating direction (counterclockwise direction) opposite to the first rotating direction. The second latch component 68 protrudes out of the second slot 64 of the monitor 54 smoothly guided by the inclined structure 687. As shown in FIG. 12, when the first latch component 66 is completely retracted into the first slot 62 and is contained in the monitor 54, the second latch component 68 completely protrudes out of the second slot 64. At this time, if the monitor 54 is rotated by 180 degrees, the second latch component 68 can be engaged in the hole 521 of the host 52. That is, the portable computer 50 is used as a tablet computer as shown in FIG. 2, and the host 52 is engaged with the monitor 54 by the second latch component 68.

In contrast, when the pushing part 70 is pushed to move in a second direction (−X direction) opposite to the first direction, the second latch component 68 is rotated in the first rotating direction (clockwise direction), so that the second latch component 68 gradually slides into the second slot 64 of the monitor 54. When the second latch component 68 slides into the second slot 64 of the monitor 54 smoothly guided by the guiding structure 76 and the stopping block 77 and the second latch component 68 slides into the second slot 64 of the monitor 54, and the first latch component 66 protrudes out of the first slot 62 of the monitor 54 smoothly guided by the inclined structure 687. In summary, the first latch component 66 or the second latch component 68 can protrude out of the monitor 54 or slide into the monitor due to two-way movement of the pushing component 70, so as to determine the latch component corresponding to the notebook computer mode or the tablet computer mode for latching the host 52 and the monitor 54.

Figure 13:
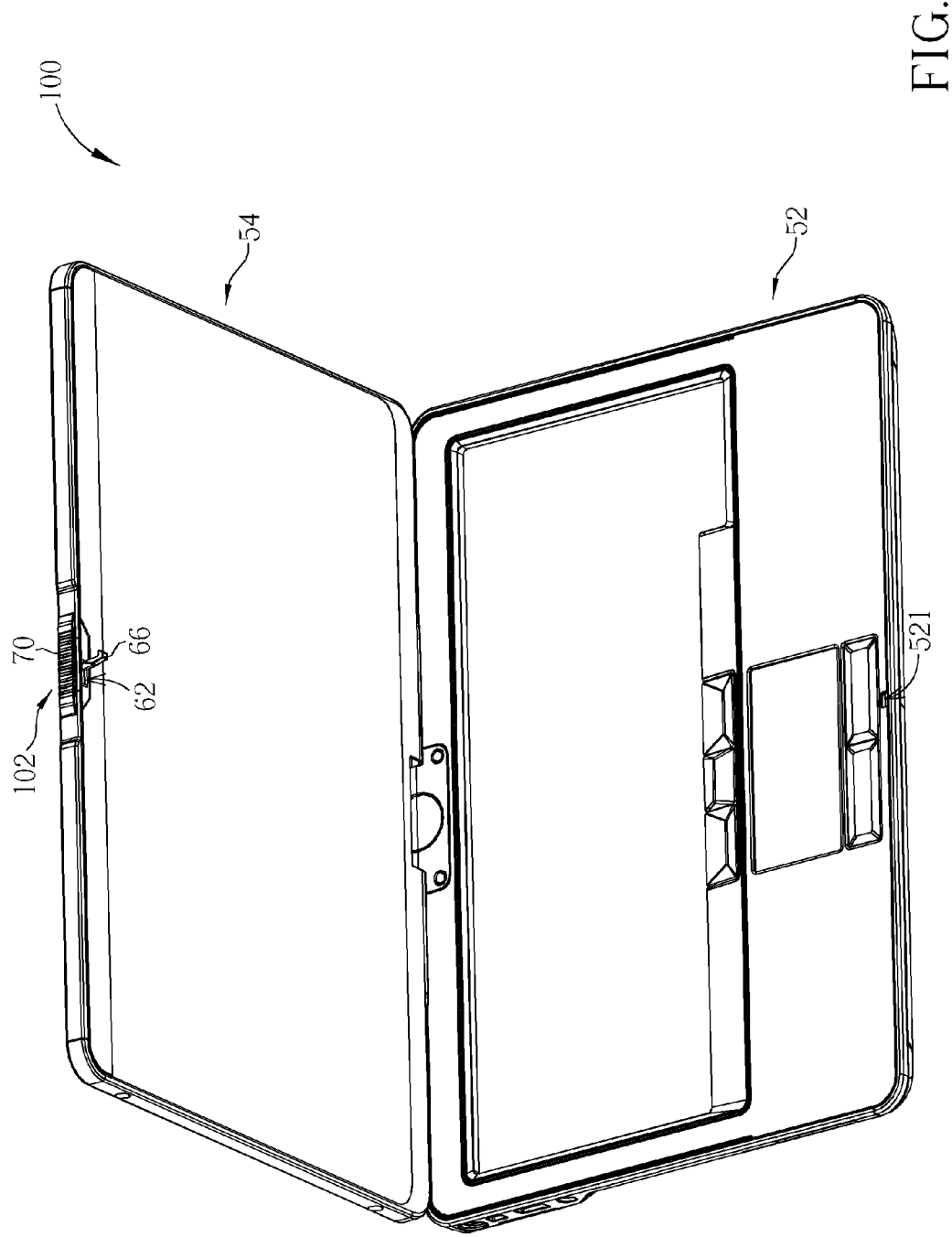
FIG. 13 is a schematic drawing of a portable computer according to another preferred embodiment of the present invention.

In addition, the latch mechanism of the present invention can be applied for mechanism of one-way latching, that is, either the first latch component or the second latch component is an omittable component. In such a manner, when the latch component needs to perform latching, the latch component protrudes out of the monitor. When the latch component is unlatched, the latch component is concealed in the monitor so as to keep a preferred aesthetic feeling of appearance. Please refer to FIG. 13. FIG. 13 is a schematic drawing of a portable computer 100 according to another preferred embodiment of the present invention. The portable computer 100 can be a notebook computer and includes the host 52 with the hole 521 being formed thereon. The portable computer 100 further includes the monitor 54 pivoted to the host 52. The main difference between this embodiment and the aforementioned embodiment is that the portable computer 100 has a latch mechanism 102 of one-way latching for latching the monitor 54 and the host 52.

Figure 14:
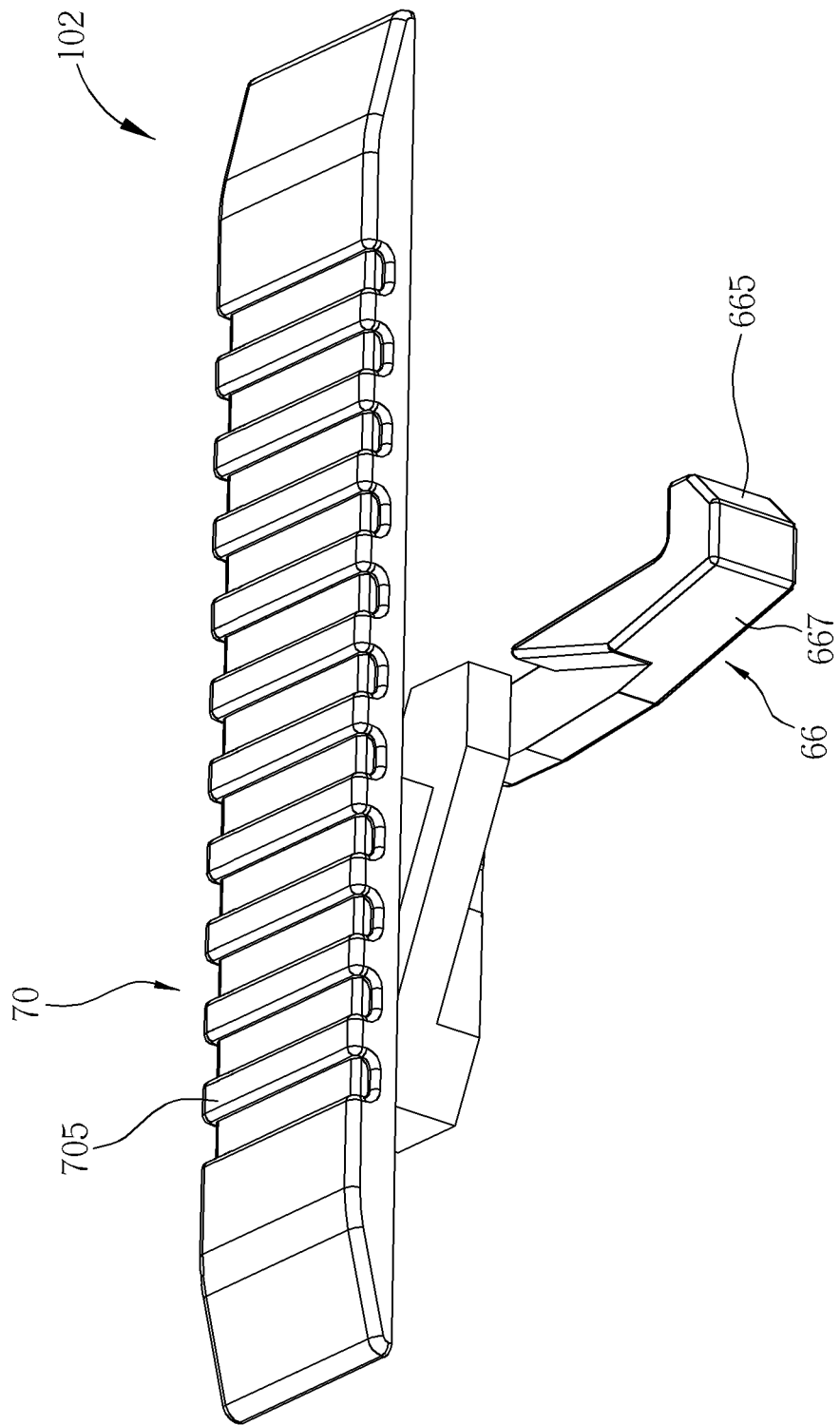
FIG. 14 is a diagram of a latch mechanism according to another preferred embodiment of the present invention.
Figure 15:
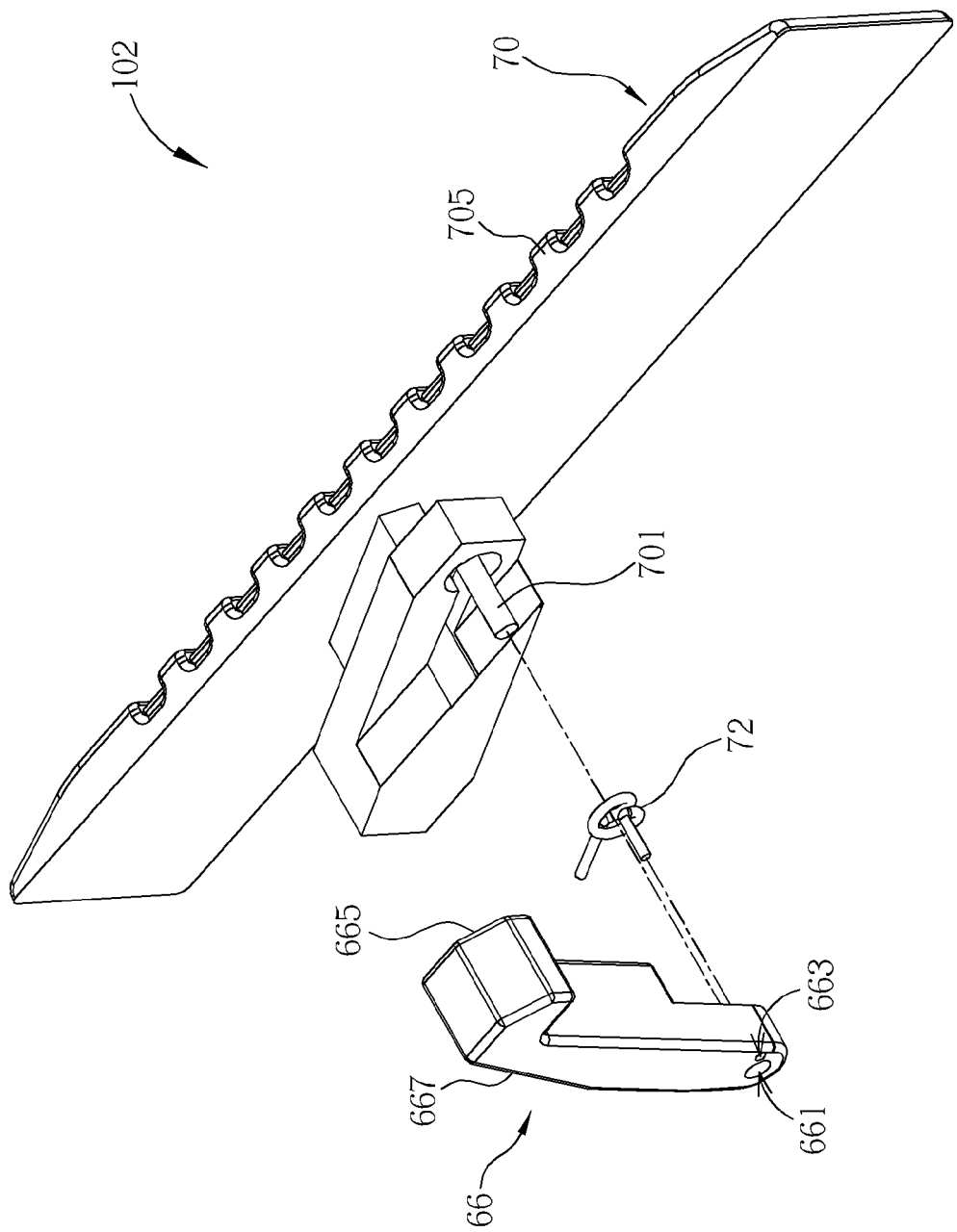
FIG. 15 is an exploded diagram of the latch mechanism according to another preferred embodiment of the present invention.

Please refer to FIG. 13 to FIG. 15. FIG. 14 is a diagram of the latch mechanism 102 according to another preferred embodiment of the present invention. FIG. 15 is an exploded diagram of the latch mechanism 102 according to another preferred embodiment of the present invention. In this embodiment, a latch mechanism 102 includes the single first latch component 66. The first latch component 66 is installed on the side of the monitor 54 in a protrusible manner from the first slot 62 of the monitor 54. The first rotating hole 661 and the first positioning hole 663 are formed on the end of the first latch component 66, and the inclined structure 665 is formed on the other end of the first latch component 66 for guiding the first latch component 66 into the opening 521 of the host 52 when the monitor 54 is closed. The inclined structure 667 is further formed on the side of the first latch component 66 opposite to that of the inclined structure 665 for guiding the first latch component 66 to protrude out of the first slot 62 of the monitor 54. The pushing component 70 is connected to the first latch component 66, and the pushing component 70 can be a push button. When the pushing component 70 is pushed to move, the first latch component 66 can move simultaneously. The first positioning post 701 is disposed on a side of the pushing component 70, and the plurality of rib structures 705 is formed on the pushing component 70 for providing a place where force is applied for pushing the pushing component 70. The resilient component 72 is installed on the pushing component 70, and an end of the resilient component 72 is connected to the first latch component 66. The resilient component 72 sheathes the first positioning post 701, and the first positioning post 701 of the pushing component 70 and an end of the resilient component 72 are respectively inserted into the first rotating hole 661 and the first positioning hole 663. The first positioning post 701 can be a rotating axis after being inserted into the first rotating hole 661, and the first positioning hole 663 is used for connecting the first latch component 66 and a body of the resilient component 72, so as to fix the first latch component 66 and the resilient component 72 on the pushing component 70.

When the pushing component 70 is pushed to move in the first direction (+X direction), the first latch component 66 rotates in the first rotating direction (clockwise direction), so that the first latch component 66 gradually slides into the first slot 62 of the monitor 54 so as to conceal the first latch component 66. The above-mentioned description for this embodiment is the same as that for FIG. 8 to FIG. 12 in the aforementioned embodiment. In contrary, when the pushing part 70 is pushed to move in the second direction (−X direction) opposite to the first direction, the first latch component 66 gradually protrudes out of the first slot 62 of the monitor 54 since the resilient component 72 provides a torque to gradually drive the first latch component 66 to rotate in the second rotating direction (counterclockwise direction). Accordingly, the first latch component 66 latches the host 52 and the monitor 54. The working principle is the same as that mentioned in the aforementioned embodiment. Only disposal of the said second and related structures is omitted, so it will not be depicted herein.

In contrast to the prior art, the movable component of the latch mechanism of the present invention is disposed on the monitor, and it can save mechanical space on the host. Furthermore, the mechanism is capable of two-way latching the host and the monitor, that is, the mechanism can be used for latching the host and the monitor both in the notebook computer mode and in the tablet computer mode. In summary, the present invention provides the latch mechanism with practicality.

Those skilled in the art will readily observe that numerous modifications and alterations of the device and method may be made while retaining the teachings of the invention.

What is claimed is:

1. A latch mechanism for latching a monitor and a host of a portable computer, comprising:
    a first latch component installed on a side of the monitor in a protrusible manner from a first slot of the monitor;
    a pushing component installed on the monitor and connected to the first latch component, the pushing component being used for driving the first latch component to rotate in a first rotating direction when being pushed in a first moving direction so that the first latch component slides into the first slot of the monitor; and
    a resilient component installed inside the monitor and on the pushing component and connected to the first latch component for driving the first latch component to rotate in a second rotating direction opposite to the first rotating direction when the pushing component is pushed in a second moving direction opposite to the first moving direction so that the first latch component protrudes out of the first slot of the monitor for latching the host.

2. The latch mechanism of claim 1, wherein a first rotating hole and a first positioning hole are formed on an end of the first latch component, a first positioning post is disposed on a side of the pushing component, the resilient component sheathes the first positioning post, and the first positioning post of the pushing component and an end of the resilient component are respectively inserted into the first rotating hole and the first positioning hole.

3. The latch mechanism of claim 1, wherein an inclined structure is formed on an end of the first latch component for guiding the first latch component to protrude out of the first slot of the monitor.

4. The latch mechanism of claim 1, wherein a plurality of rib structures is formed on the pushing component.

5. The latch mechanism of claim 1, wherein the resilient component is a torsion spring.

6. The latch mechanism of claim 1, further comprising a second latch component installed on another side of the monitor in a protrusible manner from a second slot of the monitor, the first latch component and the second latch component being respectively connected to both ends of the resilient component, the pushing component being further used for driving the second latch component to rotate in the first rotating direction when being pushed in the second moving direction so that the second latch component slides into the second slot of the monitor, and the resilient component being further used for driving the second latch component to rotate in the second rotating direction when the pushing component is pushed in the first moving direction so that the second latch component protrudes out of the second slot of the monitor for latching the host.

7. The latch mechanism of claim 6, wherein a second rotating hole and a second positioning hole are formed on an end of the second latch component, a second positioning post is disposed on a side of the pushing component, the resilient component sheathes the second positioning post, and the second positioning post of the pushing component and an end of the resilient component are respectively inserted into the second rotating hole and the second positioning hole.

8. The latch mechanism of claim 6, wherein an inclined structure is formed on an end of the second latch component for guiding the second latch component to protrude out of the second slot of the monitor.

9. A portable computer, comprising:
    a host, a hole being formed on the host;
    a monitor pivoted to the host, a first slot being formed on a side of the monitor; and
    a latch mechanism for latching the monitor and the host, comprising:
        a first latch component installed on the side of the monitor in a protrusible manner from the first slot of the monitor;
        a pushing component installed on the monitor and connected to the first latch component, the pushing component being used for driving the first latch component to rotate in a first rotating direction when being pushed in a first moving direction so that the first latch component slides into the first slot of the monitor; and
        a resilient component installed inside the monitor and on the pushing component and connected to the first latch component for driving the first latch component to rotate in a second rotating direction opposite to the first rotating direction when the pushing component is pushed in a second moving direction opposite to the first moving direction so that the first latch component protrudes out of the first slot of the monitor for latching the hole of the host.

10. The portable computer of claim 9, wherein a first rotating hole and a first positioning hole are formed on an end of the first latch component, a first positioning post is disposed on a side of the pushing component, the resilient component sheathes the first positioning post, and the first positioning post of the pushing component and an end of the resilient component are respectively inserted into the first rotating hole and the first positioning hole.

11. The portable computer of claim 9, wherein an inclined structure is formed on an end of the first latch component for guiding the first latch component to protrude out of the first slot of the monitor.

12. The portable computer of claim 9, wherein a guiding structure is formed on a lateral side of the first slot of the monitor for guiding the first latch component to slide into the first slot of the monitor.

13. The portable computer of claim 9, wherein a plurality of rib structures is formed on the pushing component.

14. The portable computer of claim 9, wherein the resilient component is a torsion spring.

15. The portable computer of claim 9, wherein a second slot is formed on another side of the monitor, the latch mechanism further comprises a second latch component installed on another side of the monitor in a protrusible manner from the second slot of the monitor, the first latch component and the second latch component are respectively connected to both ends of the resilient component, the pushing component is further used for driving the second latch component to rotate in the first rotating direction when being pushed in the second moving direction so that the second latch component slides into the second slot of the monitor, and the resilient component is further used for driving the second latch component to rotate in the second rotating direction when the pushing component is pushed in the first moving direction so that the second latch component protrudes out of the second slot of the monitor for latching the hole of the host.

16. The portable computer of claim 15, wherein a second rotating hole and a second positioning hole are formed on an end of the second latch component, a second positioning post is disposed on a side of the pushing component, the resilient component sheathes the second positioning post, and the second positioning post of the pushing component and an end of the resilient component are respectively inserted into the second rotating hole and the second positioning hole.

17. The portable computer of claim 15, wherein an inclined structure is formed on an end of the second latch component for guiding the second latch component to protrude out of the second slot of the monitor.

18. The portable computer of claim 15, wherein a guiding structure and a stopping block are formed on a lateral side of the second slot of the monitor for guiding the second latch component to slide into the second slot of the monitor.

19. The portable computer of claim 15, wherein the monitor is pivoted to the host in a convertible manner.

* * * * *